United States Patent
Lee

(10) Patent No.: US 6,433,816 B1
(45) Date of Patent: Aug. 13, 2002

(54) METHOD FOR COMPENSATING FOR NOISE IN LANE DRIFTING WARNING SYSTEM

(75) Inventor: Dong-Min Lee, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/466,023

(22) Filed: Dec. 17, 1999

(30) Foreign Application Priority Data

Jul. 8, 1999 (KR) .......................................... 99-275212

(51) Int. Cl.$^7$ ................................................. H04N 7/18
(52) U.S. Cl. ........................................ 348/148; 348/149
(58) Field of Search ................................ 348/143, 148, 348/149, 169, 118; 382/199, 104, 298, 203, 153, 162

(56) References Cited

U.S. PATENT DOCUMENTS

| | | | |
|---|---|---|---|
| 5,416,520 A | * 5/1995 | Kuzma | 348/409 |
| 5,667,033 A | * 9/1997 | Shimizu et al. | 180/272 |
| 5,835,028 A | * 11/1998 | Bender et al. | 340/937 |
| 5,987,174 A | * 11/1999 | Nakamura et al. | 382/199 |
| 6,038,496 A | * 3/2000 | Dobler et al. | 701/3 |
| 6,281,805 B1 | * 8/2001 | Lee | 340/901 |

\* cited by examiner

Primary Examiner—Vu Le
Assistant Examiner—Behrooz Senfi
(74) Attorney, Agent, or Firm—Christie, Parker & Hale, LLP

(57) ABSTRACT

A method of compensating for noise in a lane drifting warning system for vehicles. The method includes the steps of converting input image signals into binary data; determining if the converted image signals are those from a start of a lane detecting process; reading previously stored data of the slant in the lane markers if it is determined that it is not the start of the lane detecting process; compensating for peripheral environment noise in the slant in the lane markers; extracting portions of the signals determined to be possible indications of road lane markers if it is determined that it is the start of the lane detecting process; extracting actual lane marker portions from the portions of the signals determined to be possible indications of road lane markers; measuring and storing a slant in the lane markers; calculating a width of a lane defined by the lane markers and determining if the vehicle is veering from the lane; and outputting a warning to alert the driver if the vehicle is veering from the lane.

2 Claims, 3 Drawing Sheets

METHOD FOR COMPENSATING FOR NOISE IN LANE DRIFTING WARNING SYSTEM

BACKGROUND OF THE INVENTION (a) Field of the Invention

The present invention relates to a method of compensating for noise in a lane drifting warning system, and more particularly to a method of compensating for peripheral environment data noise in road image signal data of a lane drifting warning system for vehicles.

(b) Description of the Related Art

A conventional lane drifting warning system, with reference to FIG. 1, comprises a camera 10 such as a concatenated disk (CCD) camera for collecting images of lane markers and outputting corresponding image signals; an electronic control unit (ECU) 11 for receiving the image signals output from the camera 10, processing the image signals using a pre-installed program to determine if the vehicle is veering from the lane it is in, and outputting alarm signals if it is determined that the vehicle is drifting out of the lane; and alarm unit 12 for outputting an alarm to alert the driver if the alarm signals are output from the ECU 11.

In such a lane drifting warning system, the most important requirements are precision and speed. That is, the system must be able to precisely determine if the vehicle is drifting out of the lane (i.e., precisely extract vehicle lane marker information), and quickly alert the driver if the vehicle is veering from within the lane.

However, in the conventional system, the image signals output by the camera 10 include peripheral environment noise. This is particularly problematic, with reference to FIG. 2, in portions of the image signals corresponding to sections 1 and 2. As a result, noise is extracted together with the lane markers such that the precise extraction of the same is not possible. Further, such peripheral environment noise slows the overall process of extracting the lane markers such that a delay occurs in alerting the driver of lane drifting.

SUMMARY OF THE INVENTION

The present invention has been made in an effort to solve the above problems.

It is an object of the present invention to provide a method of effectively compensating for peripheral environment data noise in road image signal data of a lane drifting warning system for vehicles such that lane marker extraction is performed accurately and in a timely manner.

To achieve the above object, the present invention provides a method of compensating for noise in a lane drifting warning system. The method includes the steps of converting input image signals into binary data; determining if the converted image signals are those from a start of a lane detecting process; reading previously stored data of the slant in the lane markers if it is determined that it is not the start of the lane detecting process; compensating for peripheral environment noise in the slant in the lane markers; extracting portions of the signals determined to be possible indications of road lane markers if it is determined that it is the start of the lane detecting process; extracting actual lane marker portions from the portions of the signals determined to be possible indications of road lane markers; measuring and storing a slant in the lane markers; calculating a width of a lane defined by the lane markers and determining if the vehicle is veering from the lane; and outputting a warning to alert the driver if the vehicle is veering from the lane.

According to a feature of the present invention, the step of compensating for peripheral environment noise in the slant in the lane markers, the slant in the lane markers is converted by adding to the slant a value equal to the amount of noise in the image signals to compensate for the noise.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
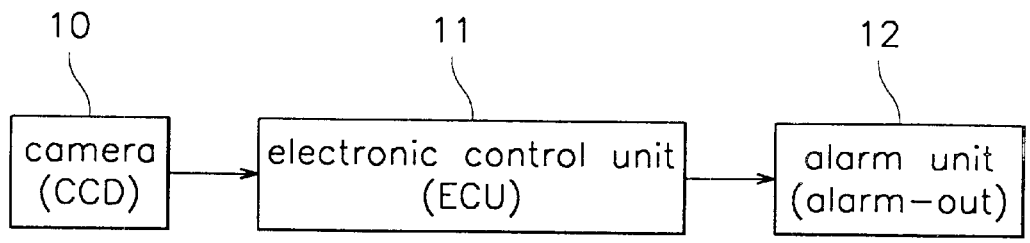
FIG. 1 is a block diagram of a conventional lane drifting warning system for vehicles.
Figure 2:
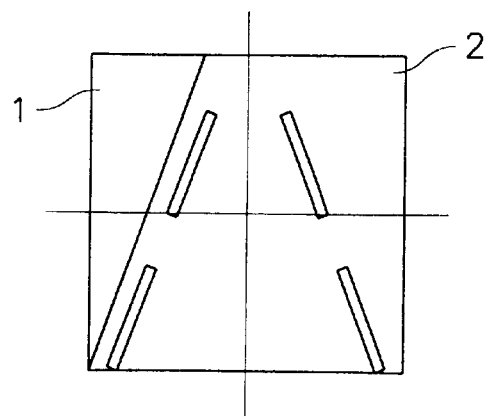
FIG. 2 is a schematic diagram of an image collected by a camera of the conventional lane drifting warning system of FIG. 1.
Figure 3:
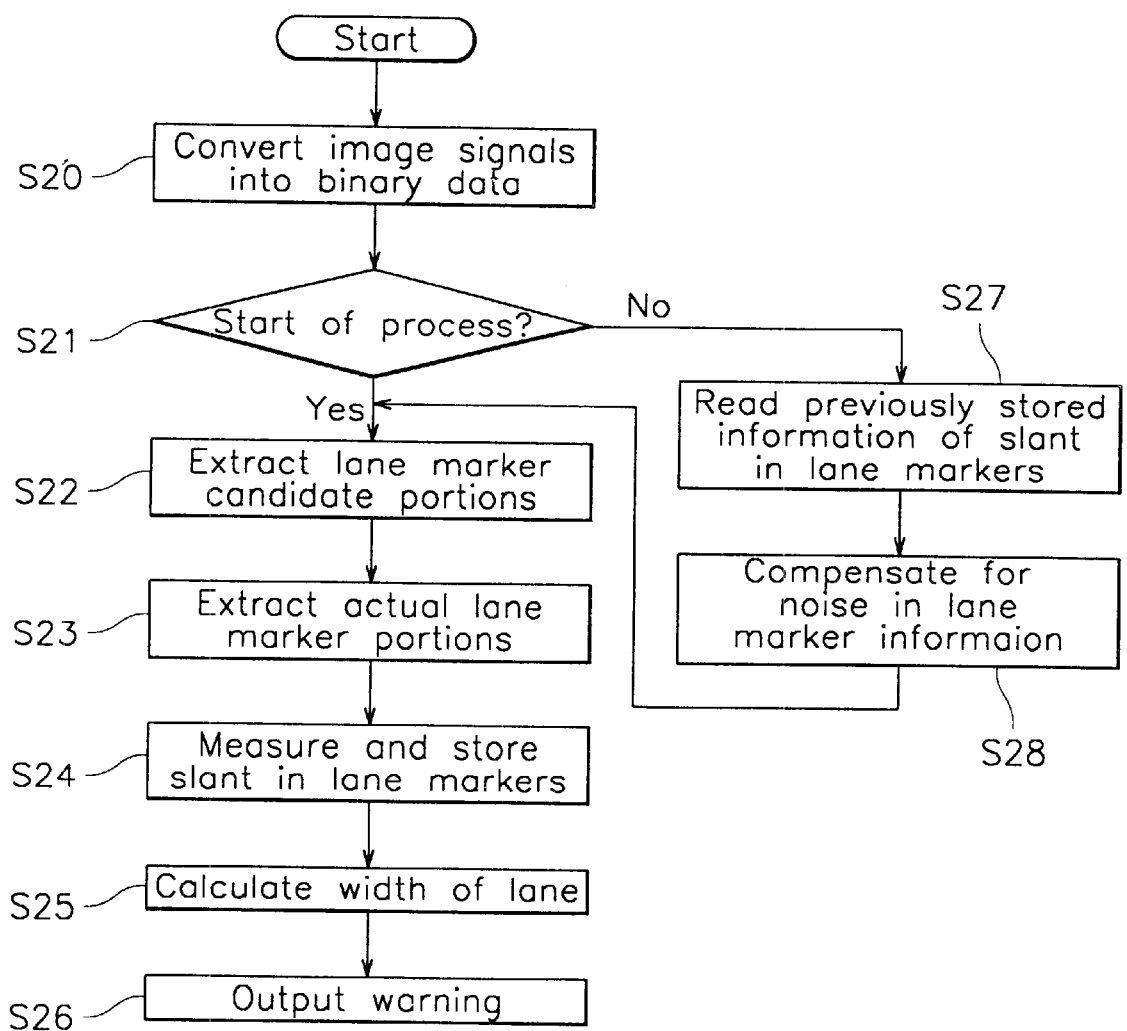
FIG. 3 is a flow chart of a method of compensating for noise in a lane drifting warning system according to a preferred embodiment of the present invention.

FIG. 3 is a flow chart of a method of compensating for noise in a lane drifting warning system according to a preferred embodiment of the present invention.

First, in step S20, a camera collects images of lane markers of a lane in which the vehicle is being driven, then the images are converted into image signals, which are processed into binary data. Next, it is determined if the lane marker image data signals processed into binary data are those from a start of the lane detecting process in step S21. If it is the start of the lane detecting process in step S21, then portions of the signals that are determined to be possible indications of road lane markers are extracted in step S22. Subsequently, portions of the signals that are determined to be actual road lane markers are extracted in step S23.

Following the above, a slant in the lane markers is measured and stored in step S24. That is, using the information of the actual lane markers extracted in step S23, the slant in the lane markers with respect an imaginary line drawn between the two lane markers and resulting from perceived spatial differences when viewing objects at a distance is determined and stored in step S24. Next, in step S25, a width of the lane is calculated using the information obtained in step S24 and it is determined if the vehicle is veering from the lane. If the vehicle is veering from the lane in step S25, a warning is output in step S26 to alert the driver.

However, in step S21 above, if it is not the start of the lane detecting process, previously stored data of the slant in the lane markers is read in step S27. Next, noise is compensated for in the data of the lane markers in step S28, after which the process returns to step S22.

The operation of the above method of the present invention will be described hereinafter with reference to elements of a lane drifting warning system.

Figure 4A:
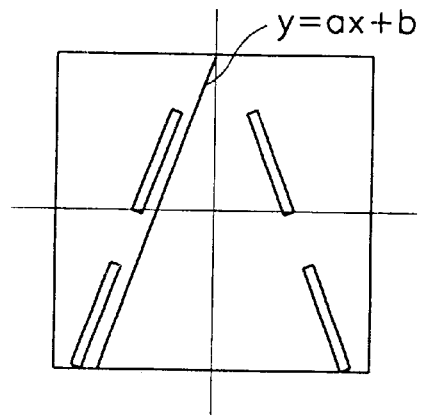
FIG. 4a is a schematic diagram of an image collected by a camera of a lane drifting warning system using a method of the present invention.
Figure 4B:
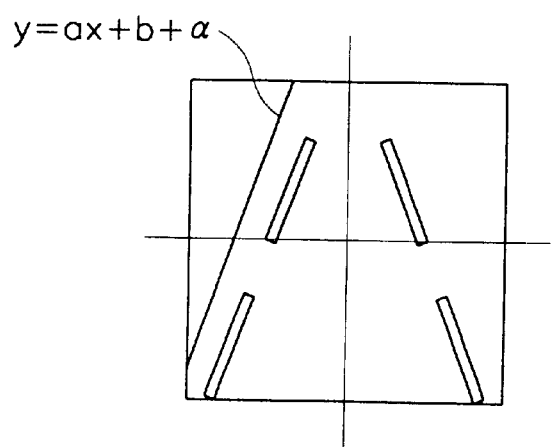
FIG. 4b is a schematic diagram of an image collected by a camera of a lane drifting warning system using a method of the present invention in which noise is compensated for in the image.

FIG. 4a is a schematic diagram of an image collected by the camera of a lane drifting warning system using the method of the present invention; and FIG. 4b is a schematic diagram of an image collected by the camera of a lane drifting warning system using a method of the present invention in which noise is compensated for in the image.

First, when the vehicle is operated, the CCD camera collects images of the lane markers within which the vehicle is being driven, and the images are converted into image signals then output. The output image signals are received by an electronic control unit (ECU) which processes the signals into binary data. This operation is described in step S20 above.

In a state where the image signals are processed into binary data, the ECU performs step S21 and determines if the lane marker image data signals processed into binary data are those from the start of the lane detecting process. That is, the ECU determines if these specific lane marker image signals have not been previously input. If it is determined that it is the start of the lane detecting process, then the ECU performs step S22 and extracts portions of the signals that are determined to be possible indications of road lane markers. Next, since the image signals processed into binary data are lane marker signals including peripheral environment data noise, the ECU performs step S23 and extracts actual lane marker portions from the portions of the signals determined to be possible indications of road lane markers.

Next, the ECU performs step S24 in which the slant in the lane markers is measured and stored. In more detail, the slope of one of the lane markers is measured in the form of a first degree equation y=ax+b (i.e., the equation for the slope of a line) as shown in FIG. 4a, after which the ECU stores this information in a memory provided therein. Following this operation, the ECU calculates the width of the lane and determines if the vehicle is veering from the lane by performing step S25. Finally, if it is determined that the vehicle is drifting out of the lane, the ECU performs step S26 and outputs a warning to alert the driver.

However, if the ECU determines that it is not the start of the lane detecting process while performing step S21 above (i.e., that these specific lane marker image signals have been previously input), the ECU then performs step S27 and reads previously stored data of the slant in the lane markers. Next, the ECU performs step S28 and converts the slant in the lane markers by adding peripheral environment noise in the lane marker image signal to the slant in the lane markers, thereby obtaining an equation of y=ax+b+α as shown in FIG. 4b. Accordingly, the peripheral environment noise is compensated for. Following this operation, the ECU then returns the process to step S22 and performs all subsequent steps.

In the method of compensating for noise in a lane drifting warning system of the present invention as described above, the noise in the lane marker image signals is compensated for while the vehicle is being driven by adjusting the slant of the lane markers by as much as the noise to compensate for the same. Accordingly, the width of the lane is quickly calculated such that veering from the same can be determined in a timely manner.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of compensating for noise in a lane drifting warning system for vehicles comprising the steps of:

converting input image signals into binary data;

determining if the converted image signals are those from a start of a lane detecting process;

reading previously stored data of the slant in the lane markers if it is determined that it is not the start of the lane detecting process;

compensating for peripheral environment noise in the slant in the lane markers;

extracting portions of the signals determined to be possible indications of road lane markers if it is determined that it is the start of the lane detecting process;

extracting actual lane marker portions from the portions of the signals determined to be possible indications of road lane markers;

measuring and storing a slant in the lane markers;

calculating a width of a lane defined by the lane markers and determining if the vehicle is veering from the lane; and outputting a warning to alert the driver if the vehicle is veering from the lane.

2. The method of claim 1 wherein in the step of compensating for peripheral environment noise in the slant in the lane markers, the slant in the lane markers is converted by adding to the slant a value equal to the amount of noise in the image signals to compensate for the noise.

* * * * *